(12) United States Patent
Mizoguchi et al.

(10) Patent No.: US 11,835,003 B2
(45) Date of Patent: Dec. 5, 2023

(54) VEHICLE CONTROLLER AND VEHICLE CONTROL METHOD

(71) Applicant: TOYOTA JIDOSHA KABUSHIKI KAISHA, Aichi-ken (JP)

(72) Inventors: Hiroaki Mizoguchi, Nagoya (JP); Shinichi Oda, Susono (JP); Yasuaki Murakami, Toyota (JP); Masahiro Kachi, Nagakute (JP)

(73) Assignee: TOYOTA JIDOSHA KABUSHIKI KAISH, Aichi-Ken (JP)

( * ) Notice: Subject to any disclaimer, the term of this patent is extended or adjusted under 35 U.S.C. 154(b) by 0 days.

(21) Appl. No.: 17/968,794

(22) Filed: Oct. 19, 2022

(65) Prior Publication Data

US 2023/0138881 A1    May 4, 2023

(30) Foreign Application Priority Data

Oct. 28, 2021   (JP) .................................. 2021-176533

(51) Int. Cl.
  *F02D 29/06*    (2006.01)
  *B60R 16/03*    (2006.01)
  *F02D 41/06*    (2006.01)
  *F02N 11/04*    (2006.01)

(52) U.S. Cl.
  CPC .............. *F02D 29/06* (2013.01); *B60R 16/03* (2013.01); *F02D 41/068* (2013.01); *F02N 11/04* (2013.01)

(58) Field of Classification Search
  CPC ....... F02D 29/06; F02D 41/068; B60R 16/03; F02N 11/04
  See application file for complete search history.

(56) References Cited

U.S. PATENT DOCUMENTS

| | | | |
|---|---|---|---|
| 8,396,647 B2 * | 3/2013 | Tsunooka | F02D 41/16 123/339.1 |
| 2004/0102892 A1 * | 5/2004 | Aldrich, III | F02D 41/083 123/339.18 |
| 2011/0208410 A1 * | 8/2011 | Izumoto | F02D 17/04 701/112 |

FOREIGN PATENT DOCUMENTS

| | | |
|---|---|---|
| JP | H9189251 A | 7/1997 |
| JP | 2010138877 A | 6/2010 |
| JP | 2011173512 A | 9/2011 |

* cited by examiner

*Primary Examiner* — Syed O Hasan
(74) *Attorney, Agent, or Firm* — HAUPTMAN HAM, LLP

(57) ABSTRACT

Electric devices of a vehicle are divided into groups according to a magnitude of electric power used by each of the electric devices. The number of the groups is smaller than the number of the electric devices. A controller for the vehicle stores in advance different correction amounts respectively associated with the groups. The controller is configured to, when the number of operating ones of the electric devices belonging to the same group is equal to or greater than a predetermined specified number, perform an increase process of increasing an engine rotation speed of an internal combustion engine by the correction amount associated with the group in which the number of the operating ones of the electric devices is equal to or greater than the specified number.

16 Claims, 2 Drawing Sheets

VEHICLE CONTROLLER AND VEHICLE CONTROL METHOD

RELATED APPLICATIONS

The present application claims priority of Japanese Application Number 2021-176533 filed on Oct. 28, 2021, the disclosure of which is hereby incorporated by reference herein in its entirety.

FIELD

The present disclosure relates to a vehicle controller and a vehicle control method.

DESCRIPTION OF RELATED ART

A vehicle disclosed in Japanese Laid-Open Patent Publication No. 9-189251 includes an internal combustion engine, an alternator, a battery, electric devices, and a controller. The alternator generates electric power based on the driving force of the internal combustion engine. The battery is charged with the electric power generated by the alternator. The electric devices use the electric power supplied from the battery. The controller determines whether the electric power stored in the battery is lower than a predetermined reference determination value. The controller increases the idle rotation speed of the internal combustion engine when the electric power stored in the battery is lower than the reference determination value.

In the vehicle disclosed in the above publication, the idling rotation speed of the internal combustion engine is changed regardless of whether the occupant of the vehicle turns on or off the electric devices and operates the accelerator pedal. If the idle rotation speed is changed regardless of various operations by the occupant, the occupant may feel uncomfortable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for a vehicle according to an aspect of the present disclosure is provided. The vehicle includes an internal combustion engine, a generator configured to generate electric power based on a driving force of the internal combustion engine, a battery configured to be charged with the electric power generated by the generator, and electric devices configured to use the electric power supplied from the battery and configured to be switched on and off by an occupant of the vehicle. The electric devices are divided into groups according to a magnitude of electric power used by each of the electric devices. The number of the groups is smaller than the number of the electric devices. The controller includes circuitry. The circuitry stores in advance different correction amounts respectively associated with the groups. The circuitry is configured to, when the number of operating ones of the electric devices belonging to the same group is equal to or greater than a predetermined specified number, perform an increase process of increasing an engine rotation speed of the internal combustion engine by the correction amount associated with the group in which the number of the operating ones of the electric devices is equal to or greater than the specified number.

A control method for a vehicle according to another aspect of the present disclosure is provided. The vehicle includes an internal combustion engine, a generator configured to generate electric power based on a driving force of the internal combustion engine, a battery configured to be charged with the electric power generated by the generator, and electric devices configured to use the electric power supplied from the battery and configured to be switched on and off by an occupant of the vehicle. The control method includes dividing the electric devices into groups according to a magnitude of electric power used by each of the electric devices, the number of the groups being smaller than the number of the electric devices, associating different correction amounts with the groups, respectively, and performing, when the number of operating ones of the electric devices belonging to the same group is equal to or greater than a predetermined specified number, an increase process of increasing an engine rotation speed of the internal combustion engine by the correction amount associated with the group in which the number of the operating ones of electric devices is equal to or greater than the specified number.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Configuration of Vehicle

An embodiment will be described below with reference to FIGS. 1 and 2. First, a schematic configuration of a vehicle 100 will be described.

Figure 1:
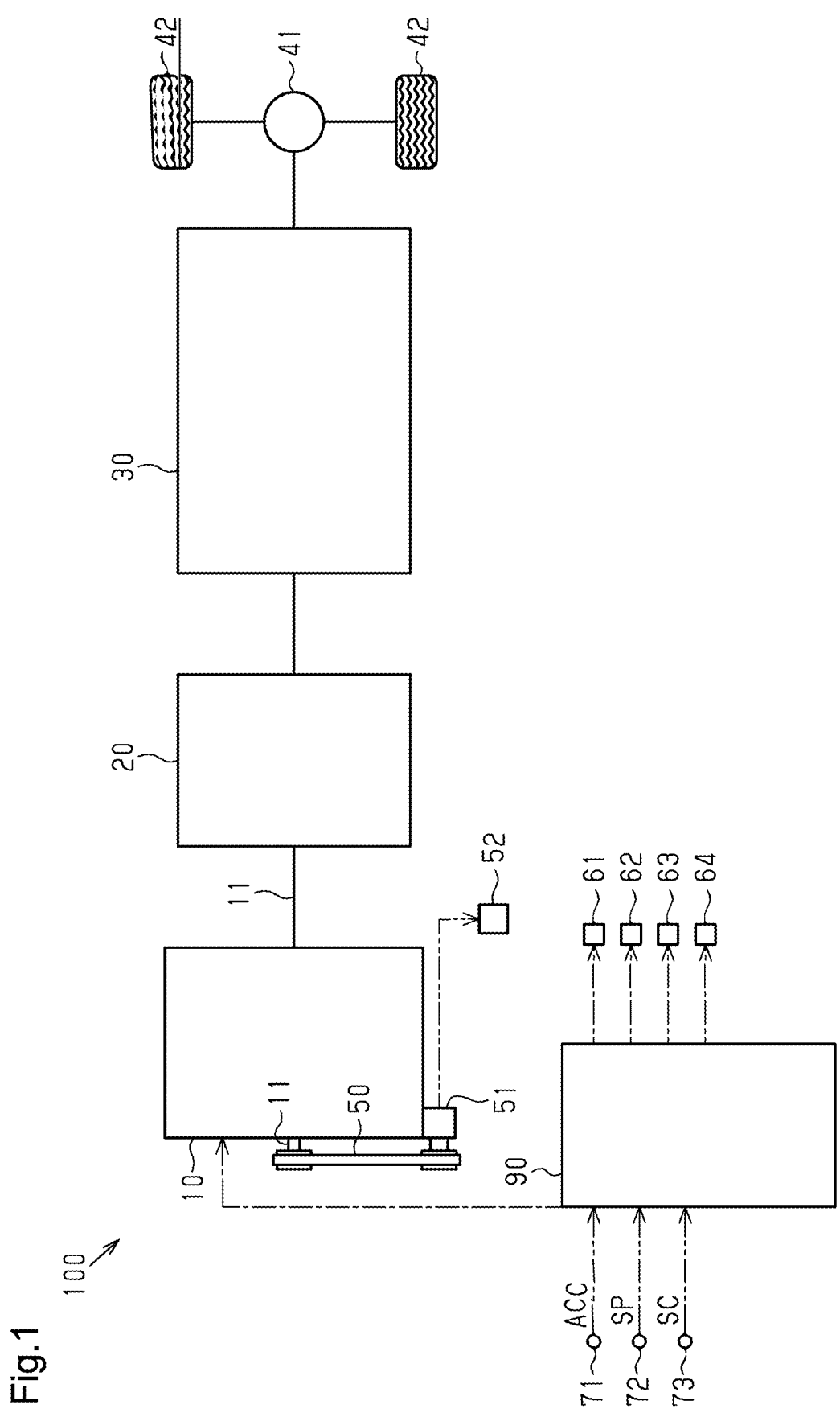
FIG. 1 is a schematic diagram showing a schematic configuration of a vehicle.

As shown in FIG. 1, the vehicle 100 includes an internal combustion engine 10, a torque converter 20, an automatic transmission 30, a differential 41, and drive wheels 42.

The internal combustion engine 10 has a crankshaft 11. A mixture of fuel and intake air is combusted in a cylinder (not shown), thereby rotating the crankshaft 11. A first end of the crankshaft 11 is connected to left and right drive wheels 42 via the torque converter 20, the automatic transmission 30, and the differential 41. The torque converter 20 converts the torque input from the crankshaft 11 and outputs it. The automatic transmission 30 selects one of gear stages according to the driving state of the vehicle 100. The automatic transmission 30 changes the torque input from the torque converter 20 at a ratio corresponding to the selected gear stage and outputs the changed torque. The differential 41 allows the left and right drive wheels 42 to have different rotation speeds. Thus, the vehicle 100 can travel with the driving force of the internal combustion engine 10.

The vehicle 100 includes a belt 50, an alternator 51, and a battery 52. The alternator 51 is connected to a second end of the crankshaft 11 via the belt 50. Therefore, the alternator 51 can generate electric power based on the driving force of the internal combustion engine 10. The electric power generated by the alternator 51 increases as an engine rotation speed NE, which is the rotation speed of the crankshaft 11, increases. In this embodiment, the alternator 51 is an example of a generator. The battery 52 is electrically connected to the alternator 51. The battery 52 is charged with electric power generated by the alternator 51.

The vehicle 100 includes electric devices, namely, a rear defogger 61, a tail lamp 62, an entire surface deicer 63, and a seat heater 64. The rear defogger 61 is attached to a portion of the rear window glass of the vehicle 100. The rear defogger 61 has a heating wire (not shown), and heats the rear window glass when the heating wire is energized. The tail lamp 62 is attached to the rear of vehicle 100. The tail lamp 62 is lit by being energized. The entire surface deicer 63 is attached to the entire windshield of the vehicle 100. The entire surface deicer 63 has a heating wire (not shown), and heats the windshield when the heating wire is energized. The seat heater 64 is attached to the seat of the vehicle 100. The seat heater 64 includes a heating wire (not shown), and heats the seat when the heating wire is energized. The rear defogger 61, the tail lamp 62, the entire surface deicer 63, and the seat heater 64 are operated using electric power supplied from the battery 52.

The electric power used by each of the rear defogger 61 and the tail lamp 62 is less than a predetermined threshold. That is, the rear defogger 61 and the tail lamp 62 belong to a first group, which is a group whose electric power used is less than the threshold. The electric power used by each of the entire surface deicer 63 and the seat heater 64 is equal to or greater than the threshold. That is, the entire surface deicer 63 and the seat heater 64 belong to a second group, which is a group whose electric power used is equal to or greater than the threshold. Accordingly, the rear defogger 61, the tail lamp 62, the entire surface deicer 63, and the seat heater 64 are divided into two groups according to the amount of electric power used. The number of the groups is less than four, which is the number of the electric devices. An example of the threshold is 10 A/sec.

The vehicle 100 includes an accelerator operation sensor 71, a vehicle speed sensor 72, and a crank angle sensor 73. The accelerator operation sensor 71 detects an accelerator operation amount ACC, which is an operation amount of an accelerator pedal operated by the driver of the vehicle 100. The larger the amount of operation of the accelerator pedal by the driver of the vehicle 100, the larger the value of the accelerator operation amount ACC. When the driver of the vehicle 100 does not operate the accelerator pedal, the accelerator operation amount ACC is zero. The vehicle speed sensor 72 detects a vehicle speed SP, which is the traveling speed of the vehicle 100. The crank angle sensor 73 is arranged near the crankshaft 11. The crank angle sensor 73 detects a crank angle SC, which is the angular position of the crankshaft 11.

The vehicle 100 includes a controller 90. The controller 90 acquires a signal indicating the accelerator operation amount ACC from the accelerator operation sensor 71. The controller 90 acquires a signal indicating the vehicle speed SP from the vehicle speed sensor 72. The controller 90 acquires a signal indicating the crank angle SC from the crank angle sensor 73. The controller 90 calculates the engine rotation speed NE, which is the rotation speed of the crankshaft 11, based on the crank angle SC.

Based on the accelerator operation amount ACC and the vehicle speed SP, the controller 90 calculates a vehicle required output, which is a required value of the output required for the vehicle 100 to travel. The controller 90 controls the internal combustion engine 10 by outputting a control signal, which is based on the vehicle required output, to the internal combustion engine 10.

The controller 90 switches the rear defogger 61, the tail lamp 62, the entire surface deicer 63, and the seat heater 64 on and off. Specifically, the controller 90 switches the rear defogger 61 on and off according to the operation of a switch (not shown) for the rear defogger 61 by the occupant of the vehicle 100. The controller 90 switches the tail lamp 62 on and off according to the operation of a switch (not shown) for the tail lamp 62 by the occupant of the vehicle 100. The controller 90 switches the entire surface deicer 63 on and off according to the operation of a switch (not shown) for the entire surface deicer 63 by the occupant of the vehicle 100. The controller 90 switches the seat heater 64 on and off according to the operation of a switch (not shown) for the seat heater 64 by the occupant of the vehicle 100.

The controller 90 stores in advance a first correction amount B1, which is a correction amount corresponding to the first group, and a second correction amount B2, which is a correction amount corresponding to the second group, to perform an increase control (described later). Details of the first correction amount B1 and the second correction amount B2 will be described later.

The controller 90 may include circuitry having one or more processors that execute various processes according to a computer program (software). The controller 90 may include circuitry having one or more dedicated hardware circuits, such as an application specific integrated circuit (ASIC), that perform at least some of the various processes. The controller 90 may include circuitry having a combination of the one or more processors and the one or more dedicated hardware circuits. The processor includes a CPU and a memory such as a RAM and a ROM. The memory stores program codes or instructions configured to cause the CPU to perform processes. The memory, or a computer-readable medium, includes any media that can be accessed by a general purpose or special purpose computer.

Among the above devices, the rear defogger 61, the tail lamp 62, the entire surface deicer 63, and the seat heater 64 are electric devices that can be turned on and off by the occupant of the vehicle 100. The controller 90, the accelerator operation sensor 71, the vehicle speed sensor 72, and the crank angle sensor 73 are electric devices that are maintained at an ON state as long as the vehicle 100 is driven. That is, these devices 90, 71, 72, and 73 are electric devices that cannot be turned on and off by the occupant of the vehicle 100 while the vehicle 100 is being driven.

Increase Control

Next, the increase control performed by the controller 90 will be described. The controller 90 repeatedly executes the increase control from when the internal combustion engine 10 starts to when the internal combustion engine 10 stops.

Figure 2:
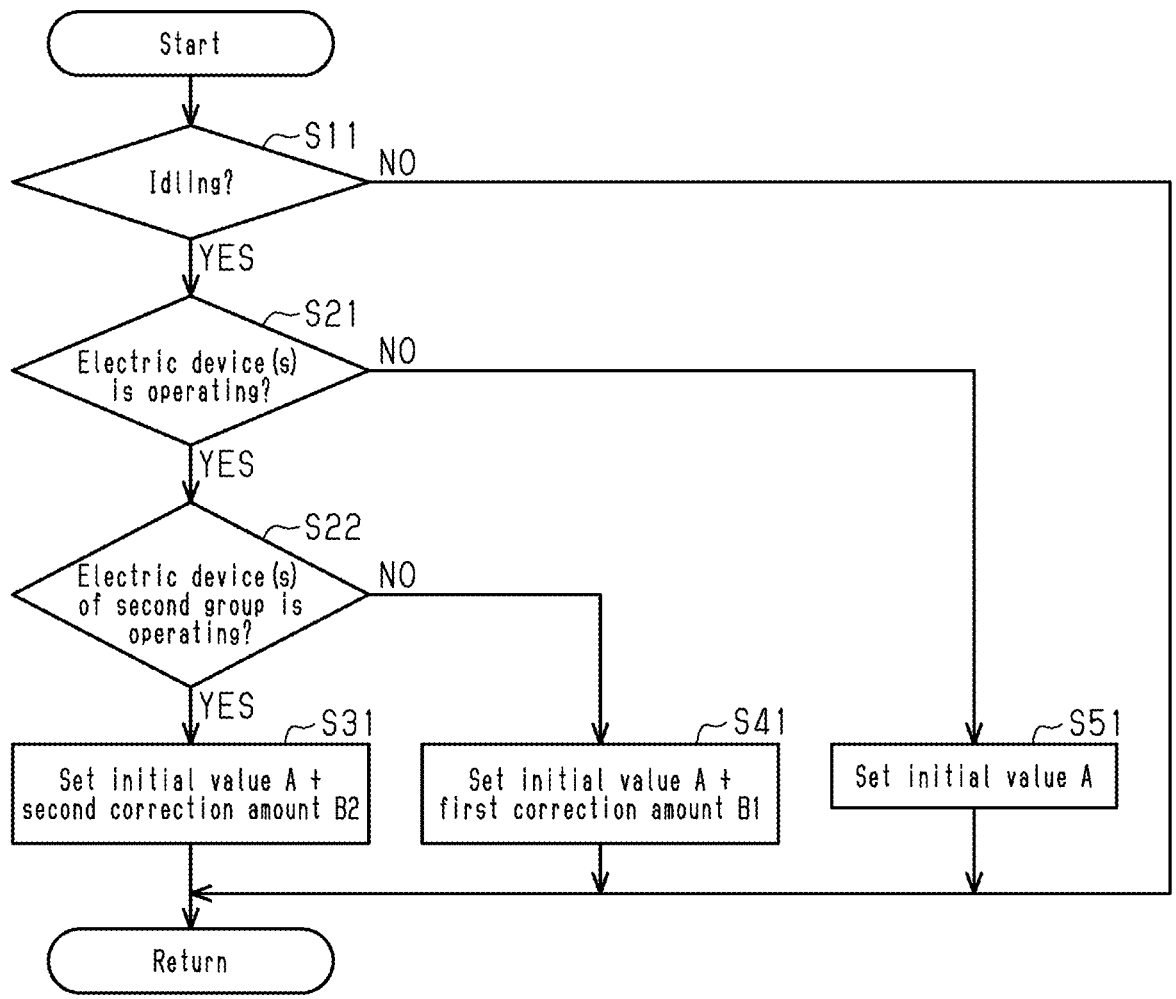
FIG. 2 is a flowchart showing an increase control.

As shown in FIG. 2, after starting the increase control, the controller 90 advances the process to step S11. In step S11, the controller 90 determines whether the internal combustion engine 10 is idling. Specifically, the controller 90 determines that the internal combustion engine 10 is idling when the accelerator operation amount ACC is zero and the vehicle speed SP is equal to or lower than a specified vehicle speed. The specified vehicle speed is predetermined to, for example, a value within the range of 0 to 5 km/h. When the controller 90 determines in step S11 that the internal combustion engine 10 is not idling (S11: NO), the controller 90 ends the current increase control and advances the process to step S11 again. When the controller 90 determines in step S11 that the internal combustion engine 10 is idling (S11: YES), the controller 90 advances the process to step S21.

In step S21, the controller 90 determines whether the electric device is operating. Specifically, the controller 90 determines that the electric device is operating when one or more of the rear defogger 61, the tail lamp 62, the entire surface deicer 63, and the seat heater 64 are operating. When the controller 90 determines in step S21 that no electric device is operating (S21: NO), the controller 90 advances the process to step S51.

In step S51, the controller 90 sets, to a predetermined initial value A, a target value of the engine rotation speed NE when the internal combustion engine 10 is idling. An example of the initial value A is several hundred rpm. After that, the controller 90 ends the current increase control and advances the process to step S11 again.

When determining in step S21 that the electric device is operating (S21: YES), the controller 90 advances the process to step S22.

In step S22, the controller 90 determines whether the electric device belonging to the second group is operating. Specifically, when at least one of the entire surface deicer 63 and the seat heater 64 belonging to the second group is operating, the controller 90 determines that the electric device belonging to the second group is operating. Therefore, in this embodiment, the specified number is 1. When the controller 90 determines in step S22 that the electric device belonging to the second group is not operating (S22: NO), the process is advanced to step S41. That is, if one or more electric devices belonging to the first group are operating and none of the electric devices belonging to the second group are operating, the controller 90 advances the process to step S41.

In step S41, the controller 90 sets, to a value obtained by adding to the initial value A the first correction amount B1, which is a correction amount corresponding to the first group, the target value of the engine rotation speed NE when the engine 10 is idling. As a result, the engine rotation speed NE is increased as compared with the case where the initial value A is set without any change. That is, the process of step S41 is an example of the increase process. The first correction amount B1 is defined as follows, for example. First, the total value of electric power used by all the electric devices belonging to the first group, that is, the rear defogger 61 and the tail lamp 62, is obtained through experiments or the like. Further, the minimum value of the engine rotation speed NE required for generating the above total value by the alternator 51 is obtained through experiments or the like. The first correction amount B1 is set to a value obtained by subtracting the initial value A from the minimum value of the required engine rotation speed NE. Therefore, the first correction amount B1 is set to a value that allows the alternator 51 to generate electric power equal to or greater than the total value of the electric power used by all the electric devices belonging to the first group. In step S41, the controller 90 does not change the engine rotation speed NE based on the second correction amount B2. After that, the controller 90 ends the current increase control and advances the process to step S11 again.

When the controller 90 determines in step S22 that the electric device belonging to the second group is operating (S22: YES), the process is advanced to step S31.

In step S31, the controller 90 sets, to a value obtained by adding to the initial value A the second correction amount B2, which is a correction amount corresponding to the second group, the target value of the engine rotation speed NE when the engine 10 is idling. As a result, the engine rotation speed NE is increased as compared with the case where the initial value A is set without any change. That is, the process of step S31 is an example of the increase process. The second correction amount B2 is defined as follows, for example. First, the total value of the electric power used by all the electric devices belonging to the second group, i.e., the entire surface deicer 63 and the seat heater 64, is obtained through experiments or the like. Further, the minimum value of the engine rotation speed NE required for generating the above total value by the alternator 51 is obtained through experiments or the like. The second correction amount B2 is set to a value obtained by subtracting the initial value A from the minimum value of the required engine rotation speed NE. Therefore, the second correction amount B2 is set to a value that allows the alternator 51 to generate electric power equal to or greater than the total value of the electric power used by all the electric devices belonging to the second group. In this embodiment, the second correction amount B2 is larger than the first correction amount B1. That is, the first correction amount B1 and the second correction amount B2 are different from each other.

In step S31, the controller 90 does not change the engine rotation speed NE based on the first correction amount B1. That is, even when the controller 90 determines that the electric devices belonging to the second group are operating and the electric devices belonging to the first group are operating, the controller 90 does not change the engine rotation speed NE based on the first correction amount B1. In other words, when the controller 90 determines that the electric devices belonging to the second group are operating, the controller 90 increases the engine rotation speed NE based only on the second correction amount B2 without changing the engine rotation speed NE based on the first correction amount B1 regardless of whether the electric devices belonging to the first group are operating. After that, the controller 90 ends the current increase control and advances the process to step S11 again.

Effect of Embodiment

For example, it is assumed that the internal combustion engine 10 is idling and the rear defogger 61, the tail lamp 62, the entire surface deicer 63, and the seat heater 64 are not operating. At this time, the engine rotation speed NE is constant at the initial value A. After that, it is assumed that the entire surface deicer 63 of the electric devices starts to be operated through an ON operation of the switch by the occupant of the vehicle 100. In this case, if the engine rotation speed NE is kept constant, the electric power supplied from the battery 52 to the entire surface deicer 63 may run short, or the electric power of the battery 52 may decrease. To solve this problem, the electric power generated by the alternator 51 is increased by increasing the engine rotation speed NE. Specifically, the controller 90 sets the target value of the engine rotation speed NE to the value obtained by adding the second correction amount B2 to the initial value A.

It is assumed that the rear defogger 61 starts to be operated by the occupant of the vehicle 100 turning on the switch while the rear defogger 61, the tail lamp 62, the entire surface deicer 63, and the seat heater 64 are not operating. In this case, the controller 90 sets the target value of the engine rotation speed NE to the value obtained by adding the first correction amount B1 to the initial value A.

Advantages of Embodiment (1) In the present embodiment, when the entire surface deicer 63 is operated by the occupant of the vehicle 100 operating the switch, the engine rotation speed NE is controlled to a value obtained by adding the second correction amount B2 to the initial value A. That is, the engine rotation speed NE changes at the point in time when the switch is turned on and off by the occupant of the vehicle 100. The engine rotation speed NE is prevented from changing independently of the ON/OFF operation of the switch by the occupant of the vehicle 100. This prevents the occupant from feeling uncomfortable due to a change in the engine rotation speed NE without the occupant's operation.

(2) It is assumed that the engine rotation speed NE is changed each time the operating conditions of the rear defogger 61, the tail lamp 62, the entire surface deicer 63, and the seat heater 64 change. In this case, the occupant of the vehicle 100 may feel uncomfortable as the engine rotation speed NE changes frequently.

In the present embodiment, the rear defogger 61, the tail lamp 62, the entire surface deicer 63, and the seat heater 64 are divided into two groups according to the amount of electric power used. The number of the groups is less than four, which is the number of the electric devices. The engine rotation speed NE is changed for the state of each group corresponding to the number of electric devices that are operating in the group. This prevents the engine rotation speed NE from changing each time the operating states of the electric devices change. That is, the occupant of the vehicle 100 is prevented from feeling uncomfortable due to frequent changes in the engine rotation speed NE.

(3) In the present embodiment, the second correction amount B2 is larger than the first correction amount B1. Therefore, the engine rotation speed NE can be adjusted according to whether the electric power used by the electric devices belonging to each group is large or small.

(4) In the present embodiment, there are two groups for changing the engine rotation speed NE. Therefore, compared to the case where the number of groups is, for example, three or more, the engine rotation speed NE is not frequently changed.

(5) In the present embodiment, when the number of operating ones of the electric devices belonging to the second group is one or more, the controller 90 increases the engine rotation speed NE based only on the second correction amount B2 without changing the engine rotation speed NE based on the first correction amount B1. When the number of operating ones of the electric devices belonging to the second group is zero and the number of operating ones of the electric devices belonging to the first group is one or more, the controller 90 does not change the engine rotation speed NE based on the second correction amount B2. In this case, the controller 90 increases the engine rotation speed NE based only on the first correction amount B1. Therefore, the engine rotation speed NE is adjusted to one of three patterns of values: a value that remains the initial value A to which neither the first correction amount B1 nor the second correction amount B2 is added; a value obtained by adding only the first correction amount B1 to the initial value A; and a value obtained by adding only the second correction amount B2 to the initial value A. Adjustment of the engine rotation speed NE in such three patterns reduces the possibility that the occupant of the vehicle 100 feels uncomfortable. Also, the electric power used by the electric devices belonging to the first group is smaller than the electric power used by the electric devices belonging to the second group. Therefore, for example, even when only one or more electric devices belonging to the second group were operating and then one or more electric devices belonging to the first group start operating, the engine rotation speed NE has already been increased based on the second correction amount B2. Thus, the possibility that the electric power of the battery 52 becomes insufficient is low.

(6) In the present embodiment, the first correction amount B1 is set to a value that allows the alternator 51 to generate electric power equal to or greater than the total value of the electric power used by all the electric devices belonging to the first group. Also, the second correction amount B2 is set to a value that allows the alternator 51 to generate electric power equal to or greater than the total value of the electric power used by all the electric devices belonging to the second group. Therefore, even when all the electric devices belonging to each group are in operation, the alternator 51 can generate a sufficient amount of electric power. As a result, if electric devices belong to the same group, a change in the number of operating ones of the electric devices does not necessitate a change in the engine rotation speed NE in order to generate a sufficient amount of electric power.

(7) In the present embodiment, the increase processes in steps S31 and S41 are performed on the condition that the accelerator operation amount ACC is zero and the vehicle speed SP is equal to or less than the specified vehicle speed. In other words, the engine rotation speed NE is increased in a situation in which the sound caused by the traveling of the vehicle 100 is less likely to occur and the occupant of the vehicle 100 is more likely to perceive the sound caused by a change in the engine rotation speed NE. It is particularly preferable to apply the above technology relating to the increase process under a situation in which a change in the engine rotation speed NE is likely to be perceived by the occupant as a change in sound.

Modified Examples

The present embodiment can be implemented with the following modifications. The present embodiment and the following modified examples can be implemented in combination with each other within a technically consistent range.

In the above embodiment, the type of electric device may be changed.

For example, the vehicle 100 may include an inverter that converts the DC power of battery 52 to AC power, and an outlet for that AC power. In this vehicle 100, when the inverter is operated, AC power can be supplied from the outlet to an external device. In such a vehicle 100, an external device is connected to the outlet through the operation of the occupant, and the inverter outputs electric power accordingly. Therefore, the inverter corresponds to the electric device that can be switched on and off by the occupant. In this way, the electric device may be not only an electric device that can be directly switched on and off by the occupant using a switch, but also an electric device that can be indirectly switched on and off.

In the above embodiment, the threshold of electric power used for grouping may be changed.

For example, the threshold can be changed according to the electric power generation capacity of the alternator 51, the electric power storage capacity of the battery 52, and the like.

In the above embodiment, the number of electric devices belonging to each group may be changed.

For example, depending on the value of the threshold, the electric power used by the tail lamp 62 may be less than the threshold, and the electric power used by the rear defogger 61 may be equal to or greater than the threshold. In this case, the tail lamp 62 belongs to the first group, and the rear defogger 61, the entire surface deicer 63, and the seat heater 64 belong to the second group. That is, the number of the electric devices belonging to the first group or the second group may be changed as long as it is one or more. However, the number of electric devices belonging to one of the groups must be plural.

In the above embodiment, the number of groups may be changed.

For example, a third group may be provided in addition to the first and second groups. That is, the number of groups may be changed as long as it is two or more and less than the number of electric devices.

In the above embodiment, the second correction amount B2 is added to the initial value A if at least one of the electric devices belonging to the second group is operating. Such a configuration may be changed.

For example, in step S22, the controller 90 may determine that the electric device belonging to the second group is operating when two or more of the entire surface deicer 63 and the seat heater 64 belonging to the second group are operating. That is, the specified number may be changed within a range of one or more and the number of electric devices belonging to the group or less. The same applies to the first group.

In the above embodiment, the correction amount may be changed.

For example, the second correction amount B2 may be set to a value that allows the alternator 51 to generate electric power equal to or greater than the total electric power used by all the electric devices belonging to the first group and the second group.

Further, for example, the second correction amount B2 may be set to a value that allows the alternator 51 to generate the electric power used only by the full-surface deicer 63 belonging to the second group. Similarly, the first correction amount B1 may be set to a value that allows the alternator 51 to generate the electric power used only by the rear defogger 61 belonging to the first group.

In the above embodiment, the conditions for using the correction amounts may be changed.

For example, when the controller 90 determines that the electric device belonging to the second group is operating and the electric device belonging to the first group is operating, both the first correction amount B1 and the second correction amount B2 may be used. Specifically, the controller 90 may set, to a value obtained by adding the first correction amount B1 and the second correction amount B2 to the initial value A, the target value of the engine rotation speed NE when the engine 10 is idling.

The initial value A in the above embodiment is not limited to a fixed value, and may be a variable value. Even when the internal combustion engine 10 is idling, the target value of the engine rotation speed NE changes depending on, for example, the amount of electric power stored in the battery 52 and the temperature of the internal combustion engine 10. Therefore, the initial value A may be a variable value determined according to various parameters of the vehicle 100 other than whether the electric device is operating. In this case, as long as the initial value A is obtained based on a predetermined map and relational equation, that value is a predetermined one.

In the above embodiment, the conditions for executing the increase process may be changed.

For example, the specified vehicle speed in step S11 may exceed 5 km/h.

Further, for example, the process of step S11 may be omitted. In other words, the controller 90 may execute the processes after step S21 not only during idling. The initial value A in this modified example is a variable value that varies according to the accelerator operation amount ACC and the like.

In the above embodiment, the configuration of the vehicle 100 may be changed.

For example, the vehicle 100 may include a motor generator as a drive source. In this configuration, if the motor generator is connected to the crankshaft 11 of the internal combustion engine 10 and can generate electric power based on the driving force of the internal combustion engine 10, the motor generator may correspond to the generator. In this case, the alternator 51 may be omitted.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, wherein
the vehicle includes
an internal combustion engine,
a generator configured to generate electric power based on a driving force of the internal combustion engine,
a battery configured to be charged with the electric power generated by the generator, and
electric devices configured to use the electric power supplied from the battery and configured to be switched on and off by an occupant of the vehicle,
the electric devices are divided into groups according to a magnitude of electric power used by each of the electric devices, a number of the groups being smaller than a number of the electric devices,
the groups include
a first group including first electric devices of the electric devices, wherein the first electric devices are configured to use the electric power less than a predetermined threshold, and the first electric devices include
a rear defogger configured to heat a rear window glass of the vehicle, and
a tail lamp attached to the vehicle and configured to light, and a second group including second electric devices of the electric devices, wherein the second electric devices are configured to use the electric power equal to or greater than the predetermined threshold, and the second electric devices include
an entire surface deicer configured to heat a windshield of the vehicle, and
a seat heater configured to heat a seat of the vehicle,
the controller comprises circuitry,
the circuitry stores in advance different correction amounts respectively associated with the groups, and
the circuitry is configured to,
determine whether at least one of the electric devices is operating, and
in response to determining that the at least one of the electric devices is operating, determine whether a number of the at least one of the operating electric devices belonging to the second group is equal to or greater than a predetermined specified number,
in response to determining that the number of the at least one of the operating electric devices belonging to the second group is less than the predetermined specified number, perform an increase process of increasing an engine rotation speed of the internal combustion engine by a first correction amount associated with the first group, and
in response to determining that the number of the at least one of the operating electric devices belonging to the second group is equal to or greater than the predetermined specified number, perform the increase process of increasing the engine rotation speed of the internal combustion engine by a second correction amount associated with the second group, wherein the first correction amount is smaller than the second correction amount.

2. The controller according to claim 1, wherein the increase process includes, in response to determining that the number of the at least one of the operating electric devices belonging to the second group is equal to or greater than the predetermined specified number, increasing the engine rotation speed by the second correction amount without changing the engine rotation speed based on the first correction amount.

3. The controller according to claim 2, wherein the increase process includes, in response to determining that (i) a number of the at least one of the operating electric devices belonging to the first group is equal to or greater than a further predetermined specified number and (ii) the number of the at least one of the operating electric devices belonging to the second group is equal to or greater than the predetermined specified number, increasing the engine rotation speed by the second correction amount without changing the engine rotation speed based on the first correction amount.

4. The controller according to claim 1, wherein the increase process includes, in response to determining that the number of the at least one of the operating electric devices belonging to the second group is equal to or greater than the predetermined specified number, increasing the engine rotation speed by the second correction amount without changing the engine rotation speed based on the first correction amount regardless of whether the first electric devices are operating.

5. The controller according to claim 2, wherein the first correction amount is set to a value that allows the generator to generate first electric power equal to or greater than a total value of the electric power used by all the first electric devices, and
the second correction amount is set to a value that allows the generator to generate second electric power equal to or greater than a total value of the electric power used by all the second electric devices.

6. The controller according to claim 1, wherein the circuitry is configured to perform the increase process on a condition that an accelerator operation amount of the vehicle is zero and a vehicle speed of the vehicle is equal to or lower than a predetermined specified vehicle speed.

7. A control method for a vehicle, wherein
the vehicle includes
an internal combustion engine,
a generator configured to generate electric power based on a driving force of the internal combustion engine,
a battery configured to be charged with the electric power generated by the generator, and
electric devices configured to use the electric power supplied from the battery and configured to be switched on and off by an occupant of the vehicle,
the control method comprises:
dividing the electric devices into groups according to a magnitude of electric power used by each of the electric devices, a number of the groups being smaller than a number of the electric devices, wherein the groups include
a first group including first electric devices of the electric devices, wherein the first electric devices are configured to use the electric power less than a predetermined threshold, and the first electric devices include
a rear defogger configured to heat a rear window glass of the vehicle, and
a tail lamp attached to the vehicle and configured to light, and
a second group including second electric devices of the electric devices, wherein the second electric devices are configured to use the electric power equal to or greater than the predetermined threshold, and the second electric devices include
an entire surface deicer configured to heat a windshield of the vehicle, and
a seat heater configured to heat a seat of the vehicle;
associating different correction amounts with the groups, respectively;
determining whether at least one of the electric devices is operating, and and
in response to determining that the at least one of the electric devices is operating, determining whether a number of the at least one of the operating electric devices belonging to the second group is equal to or greater than a predetermined specified number,
in response to determining that the number of the at least one of the operating electric devices belonging to the second group is less than the predetermined specified number, performing an increase process of increasing an engine rotation speed of the internal combustion engine by a first correction amount associated with the first group, and in response to determining that the number of the at least one of the operating electric devices belonging to the second group is equal to or greater than the predetermined specified number, performing the increase process of increasing the engine rotation speed of the internal combustion engine by a second correction amount associated with the second group, wherein the first correction amount is smaller than the second correction amount.

8. The controller according to claim 1, wherein the predetermined threshold is 10A/sec.

9. The controller according to claim 8, wherein the number of the groups is less than 4.

10. The control method according to claim 7, wherein the increase process includes, in response to determining that the number of the at least one of the operating electric devices belonging to the second group is equal to or greater than the predetermined specified number, increasing the engine rotation speed by the second correction amount without changing the engine rotation speed based on the first correction amount.

11. The control method according to claim 7, wherein the increase process includes, in response to determining that (i) a number of the at least one of the operating electric devices belonging to the first group is equal to or greater than a further predetermined specified number and (ii) the number of the at least one of the operating electric devices belonging to the second group is equal to or greater than the predetermined specified number, increasing the engine rotation speed by the second correction amount without changing the engine rotation speed based on the first correction amount.

12. The control method according to claim 7, wherein the increase process includes, in response to determining that the number of the at least one of the operating electric devices belonging to the second group is equal to or greater than the predetermined specified number, increasing the engine rotation speed by the second correction amount without changing the engine rotation speed based on the first correction amount regardless of whether the first electric devices are operating.

13. The control method according to claim 7, wherein the first correction amount is set to a value that allows the generator to generate first electric power equal to or greater than a total value of the electric power used by all the first electric devices, and
the second correction amount is set to a value that allows the generator to generate second electric power equal to or greater than a total value of the electric power used by all the second electric devices.

14. The control method according to claim 7, wherein the increase process is performed on a condition that an accelerator operation amount of the vehicle is zero and a vehicle speed of the vehicle is equal to or lower than a predetermined specified vehicle speed.

15. The control method according to claim 7, wherein the predetermined threshold is 10A/sec.

16. The control method according to claim 15, wherein the number of the groups is less than 4.

* * * * *

UNITED STATES PATENT AND TRADEMARK OFFICE
CERTIFICATE OF CORRECTION

| | |
|---|---|
| PATENT NO. | : 11,835,003 B2 |
| APPLICATION NO. | : 17/968794 |
| DATED | : December 5, 2023 |
| INVENTOR(S) | : Hiroaki Mizoguchi et al. |

It is certified that error appears in the above-identified patent and that said Letters Patent is hereby corrected as shown below:

On the Title Page

Item (73), Lines 1 to 2, change "TOYOTA JIDOSHA KABUSHIKI KAISH, Aichi-Ken (JP)" to -- TOYOTA JIDOSHA KABUSHIKI KAISHA, Aichi-ken (JP) --

Signed and Sealed this
Twelfth Day of March, 2024

Katherine Kelly Vidal
Director of the United States Patent and Trademark Office